No. 651,649. Patented June 12, 1900.
S. R. BROWN.
BICYCLE STAND.
(Application filed Feb. 21, 1899.)
(No Model.) 2 Sheets—Sheet 1.

WITNESSES:
A. R. Krousse
Russell M. Everett

INVENTOR
Sedgwick R. Brown,
BY
Drake & Co.
ATTORNEYS

No. 651,649. Patented June 12, 1900.
S. R. BROWN.
BICYCLE STAND.
(Application filed Feb. 21, 1899.)
(No Model.) 2 Sheets—Sheet 2.
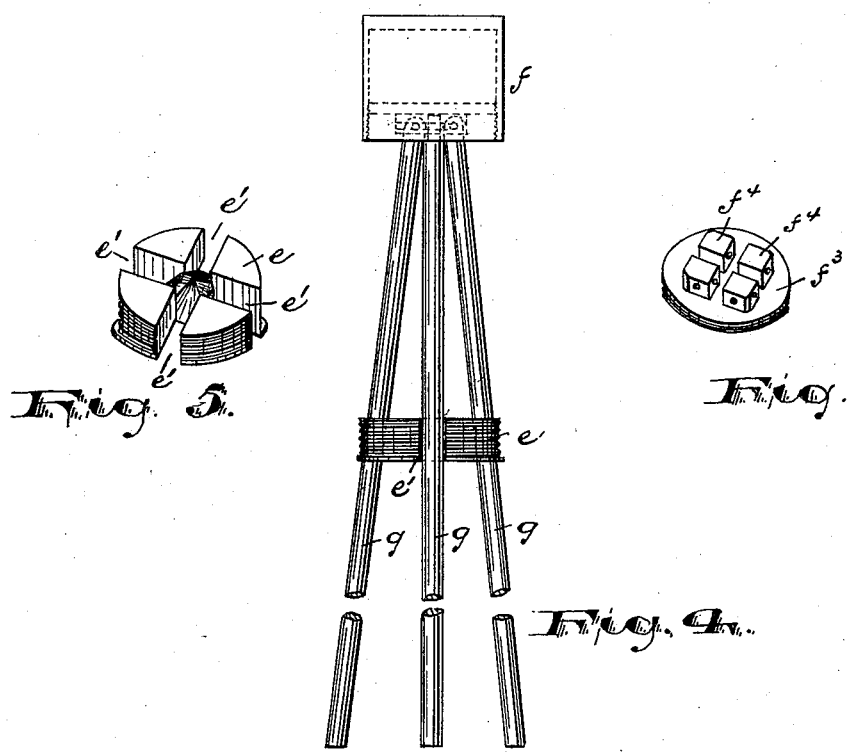
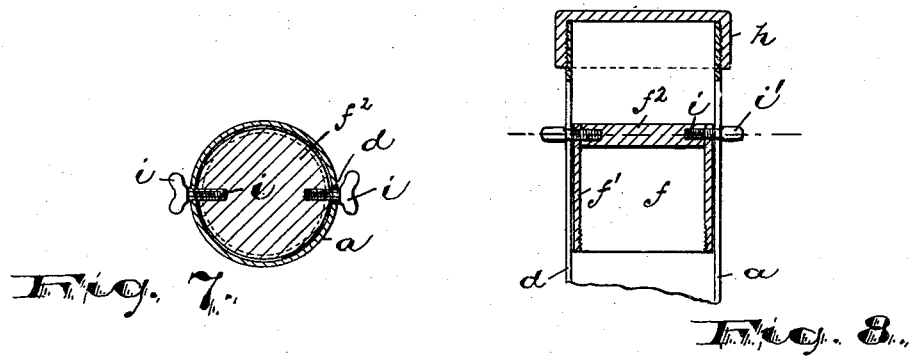
WITNESSES: INVENTOR,
Sedgwick R. Brown,
BY
Drake & Co.
ATTORNEYS

UNITED STATES PATENT OFFICE.

SEDGWICK R. BROWN, OF HIGH BRIDGE, NEW JERSEY.

BICYCLE-STAND.

SPECIFICATION forming part of Letters Patent No. 651,649, dated June 12, 1900.

Application filed February 21, 1899. Serial No. 706,324. (No model.)

*To all whom it may concern:*

Be it known that I, SEDGWICK R. BROWN, a citizen of the United States, residing at High Bridge, in the county of Hunterdon and State of New Jersey, have invented certain new and useful Improvements in Bicycle-Stands; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to secure a firm support for bicycles and like vehicles in holding the same in vertical position when the said vehicle is out of service; to provide a device that can be quickly and easily folded or closed, so that the legs or supporting-braces will not interfere with the movement of the vehicle and may be quickly lowered into contact with the ground to support or hold the vehicle erect while the rider leaving his machine attends to business or the like; to increase the neatness of appearance of the device and reduce the number of garment-catching projections by inclosing all the working parts within the device, where they will be concealed from sight, and to secure other advantages and results, some of which may be referred to hereinafter in connection with the description of the working parts.

The invention consists in the improved bicycle support or holder and in the arrangements and combinations of parts of the same, all substantially as will be hereinafter set forth, and finally embraced in the claim.

Figure 1:
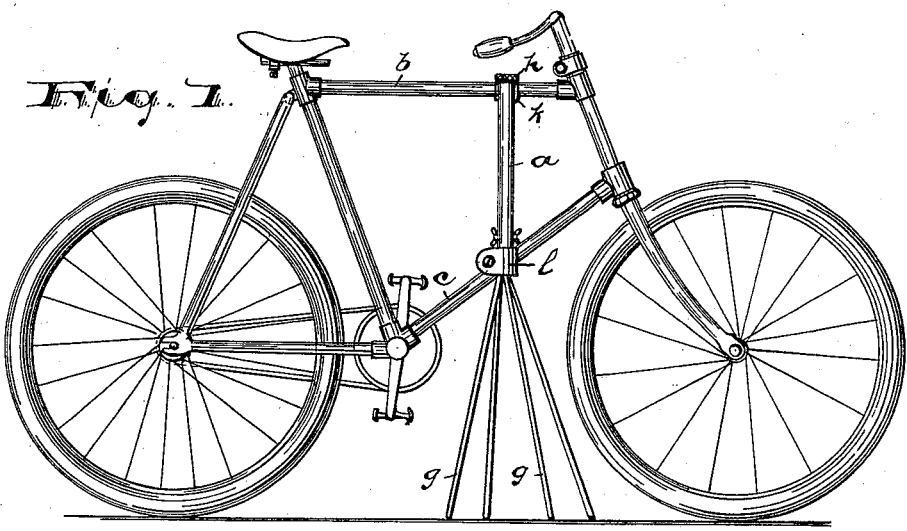
Figure 2:
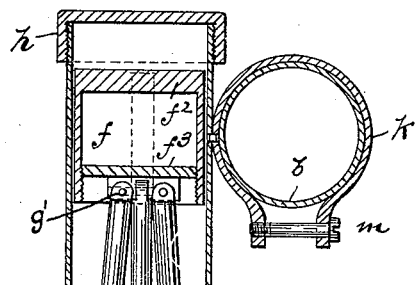
Figure 3:
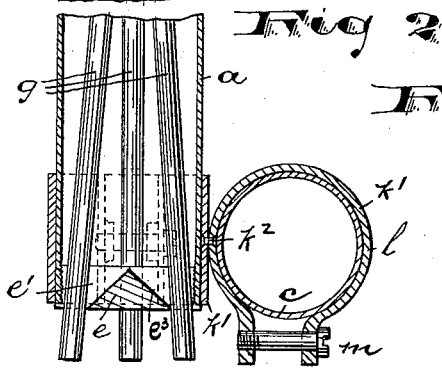
Figure 3:
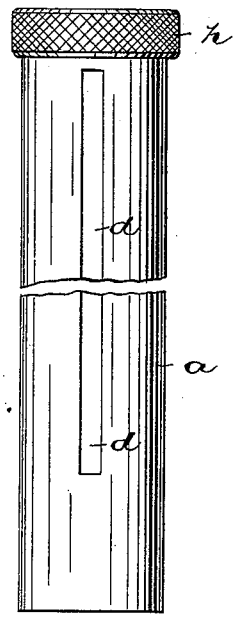

Referring to the accompanying drawings, in which like letters of reference indicate corcorresponding parts in each of the several views, Figure 1 is a side elevation of a bicycle to which my improvement has been applied. Fig. 2 is a longitudinal section of a portion of the support or holder on an enlarged scale. Fig. 3 is a side elevation of a portion of the case of said support or holder, showing a longitudinal slot therein. Fig. 4 shows a certain sliding piece adapted to be arranged within the case and to which legs or standards are pivoted. Fig. 5 is a perspective view of a certain bottom piece of the case. Fig. 6 is a perspective view of a bottom plate of the said sliding piece, and Figs. 7 and 8 are sectional views showing means of fastening the said sliding piece in the case.

In said drawings, $a$ indicates the outer case of the support or holder, which is tubular in form and is adapted to extend from the approximately-horizontal bar $b$ of the frame of the vehicle to the inclined lower bar $c$ thereof and be removably clamped or fastened thereto in any suitable manner. The said case $a$ is of tubular form and of light metal and is provided at opposite sides with longitudinal slots $d$, which extend from near the top of the said tubular case to near the bottom thereof. Within the bottom of said case the same is provided with a bottom piece $e$, preferably held in place by screw-threads and removable from the tubular portion of the case to permit the ready withdrawal of the sliding piece $f$, hereinafter referred to. The said bottom piece $e$ is provided at its periphery with a series of radial notches, preferably four, which are isometrically disposed and form, with the tubular case, open passages, through which the legs or braces $g$ extend to engage the ground and hold the vehicle erect. The notches or passages $e'$ permit of the sliding of the said legs in the folding or closing operation, the said notches being of a size to hold the said legs with firmness and having on the upper side of said bottom piece inclined walls $e^3$, Fig. 2, to permit the sliding and change of angle or inclination due to the sliding operation, as will be hereinafter described.

The top of the tubular case is provided with a cap $h$, which may be screwed upon the upper end of said case or be otherwise secured thereon. Also within the said tubular case the same is provided with the said sliding piece $f$, which comprises, preferably, a short tubular section $f'$, at the top of which is inserted a top plate $f^2$, adapted to provide a bearing for set-screws $i$, and a bottom plate $f^3$, having on the under side bosses $f^4$, between which the upper ends of the legs are pivoted, as at $g'$, Fig. 2. Said set-screws $i$ of the sliding piece $f$ extend through the slots $d$, the finger-flanges $i'$ of said set-screws lying outside of the said case and permitting the fingers of the operator to bear thereon in the operation of pressing the sliding piece downward in the case in the act of lowering the legs $g$ into engagement with the ground or in lifting the sliding piece in the act of folding up the said legs. The said set-screws $i$ not only serve in facilitating the sliding of the said sliding piece, but also serve as clamp-screws for fixing the said sliding piece $f$ in position and thus holding the legs firmly in place either in their raised or lowered position. At the outside of said case $a$, at or near the lower end thereof and at or near the upper end thereof, the same is provided with clamping-clips $k\,l$, by means of which the case is held firmly to the vehicle-frame. The said clips are provided with clamp-screws $m$, by means of which they are fastened rigidly upon the tubular case and upon the bar or bars of the frame adjacent thereto, the upper pair of clip-sections fastening the case to the horizontal bar $b$ of the frame and the lower pair of clip-sections fastening the case to the inclined bar. The clips are preferably composed of two strap-like sections $k'\,k'$, one to inclose the bar of the vehicle-frame and the other to inclose the case $a$. These sections are riveted together in the lower clip by a pivotal rivet $k^2$. By riveting the clip-sections together by a single rivet the said sections are permitted a pivotal movement one with relation to the other, so that they may be adjusted in their relation to one another to permit the case to be fastened to bars of various inclines.

I may dispense in the upper pair of clip-sections with one of the members of the pair and provide the remaining clip with a headed shank adapted to enter the case, as shown in Fig. 2.

In operating the device by raising the sliding piece to which the legs $g$ are attached the said legs are drawn upward into the case, where they are protected from injury and will not interfere with the operation of the vehicle. By reversing the movement of the slide, pressing the same downward, the legs are lowered into contact with the ground, and because of the relation of the pivots at the upper ends of the legs with the walls of the slots at the periphery of the lower end piece $e$ of the case the said legs $g$ are caused to spread at their lower extremities, thus disposing the legs at various inclines or at an angle one to another, whereby the said vehicle is prevented from falling from its proper vertical position.

Having thus described the invention, what I claim as new is—

The combination with the slotted cylindrical tubular case, and a radially slotted or notched bottom piece screwed into said case at the lower end thereof, of a sliding piece diametrically filling said case and adapted to slide longitudinally therein with a positive motion, set-screws projecting from said sliding piece through the slots of the case, and serving both as finger-pieces for moving the slide and as means for fixing the slide in any position, and legs extending from said sliding piece downward in the case and lying in the radial slots or notches of the bottom piece, said bottom piece serving to hold said legs in proper relative position to one another when drawn into the case and to spread said legs automatically when the sliding piece is forced downward, substantially as set forth.

In testimony that I claim the foregoing I have hereunto set my hand this 18th day of January, 1899.

SEDGWICK R. BROWN.

Witnesses:
CHARLES H. PELL,
C. B. PITNEY.